United States Patent [19]

Colmelet

[11] Patent Number: 4,618,670

[45] Date of Patent: Oct. 21, 1986

[54] METHOD FOR PRODUCTION OF USEFUL SUBSTANCES FROM SOYMEAL

[75] Inventor: Giorgio Colmelet, Milan, Italy

[73] Assignee: Novavis Intercontinental, Ltd., San Mateo, Calif.

[21] Appl. No.: 713,586

[22] Filed: Mar. 19, 1985

Related U.S. Application Data

[63] Continuation-in-part of Ser. No. 587,838, Mar. 12, 1984, abandoned, which is a continuation of Ser. No. 516,285, Jul. 22, 1983, abandoned.

[51] Int. Cl.$^4$ .......................... A23J 1/14; C07K 3/28
[52] U.S. Cl. .................................... 530/378; 426/629; 426/634; 426/656; 426/657; 530/407; 530/414; 502/180
[58] Field of Search ...................... 260/123.5, 112 R; 426/629, 634, 656, 657

[56] References Cited

U.S. PATENT DOCUMENTS

| | | |
|---|---|---|
| 2,991,309 | 7/1961 | Hoglan et al. ...................... 562/516 |
| 3,001,875 | 9/1961 | Sair ....................... 426/656 |
| 3,152,955 | 10/1964 | Gow et al. .................. 260/112 R X |
| 3,185,675 | 5/1965 | Schmitz et al. .................. 260/112 R |
| 3,697,287 | 10/1972 | Winitz .................... 426/73 |
| 3,698,912 | 10/1972 | Winitz .................... 426/656 |
| 3,701,666 | 10/1972 | Winitz .................... 426/311 |
| 3,778,514 | 12/1973 | Olson et al. ........................... 426/61 |
| 3,950,547 | 4/1976 | Lamar, III et al. ................... 426/74 |
| 3,995,071 | 11/1976 | Goodnight, Jr. et al. .......... 426/598 |
| 4,054,677 | 10/1977 | Orban .................... 426/602 |
| 4,091,120 | 5/1978 | Goodnight, Jr. et al. .......... 426/598 |
| 4,130,555 | 12/1978 | Ohtsuka et al. ...................... 260/117 |
| 4,172,828 | 10/1979 | Davidson ......................... 260/123.5 |
| 4,185,121 | 1/1980 | Huster et al. ....................... 426/250 |
| 4,420,425 | 12/1983 | Lawhon ........................... 260/123.5 |

Primary Examiner—Howard E. Schain
Attorney, Agent, or Firm—Flehr, Hohbach, Test, Albritton & Herbert

[57] ABSTRACT

A method is provided for recovering useful products from de-oiled soymeal. At least two useful products, a soluble proteic substance and a mixture of free amino acids, are recovered.

20 Claims, 2 Drawing Figures

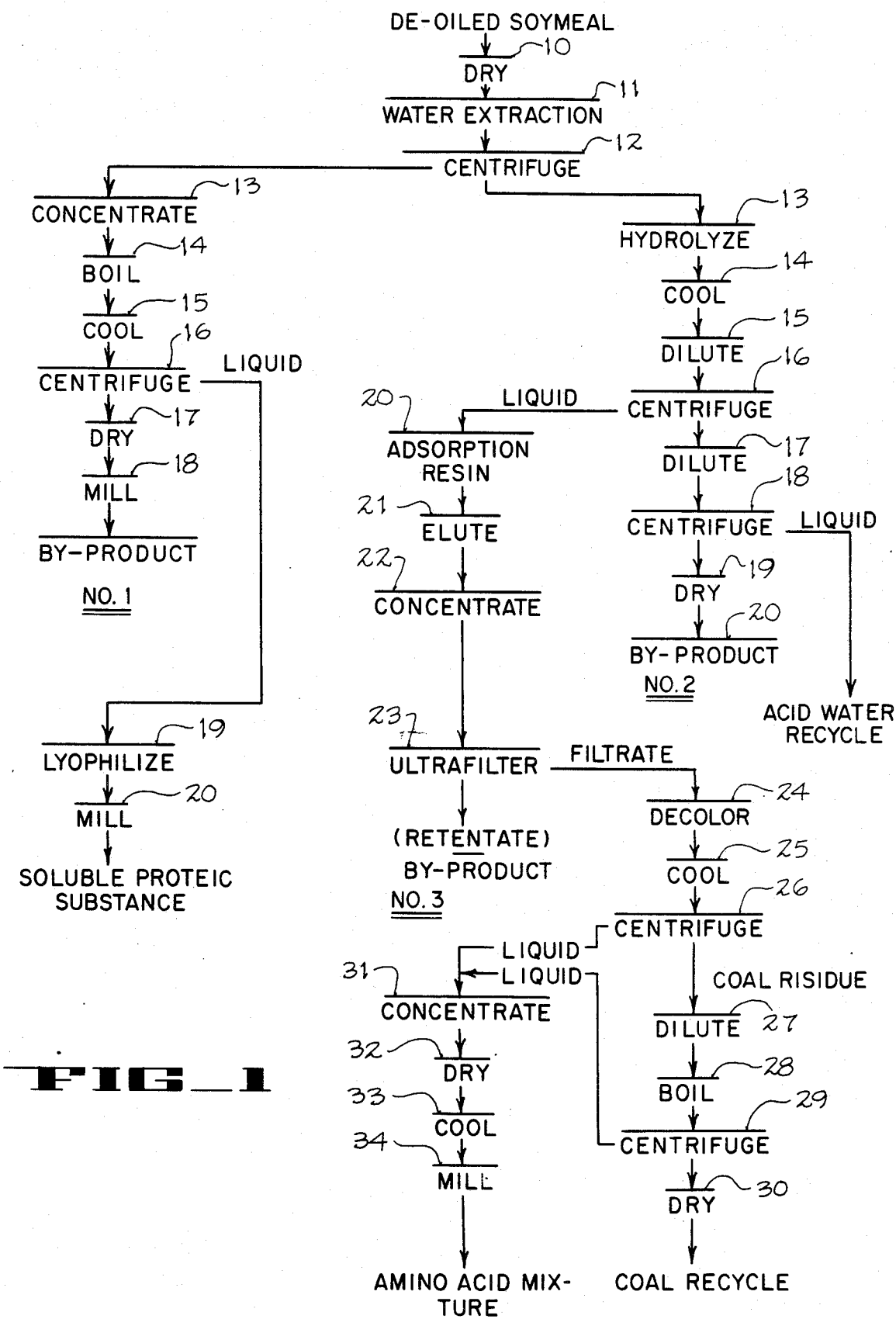
FIG_1

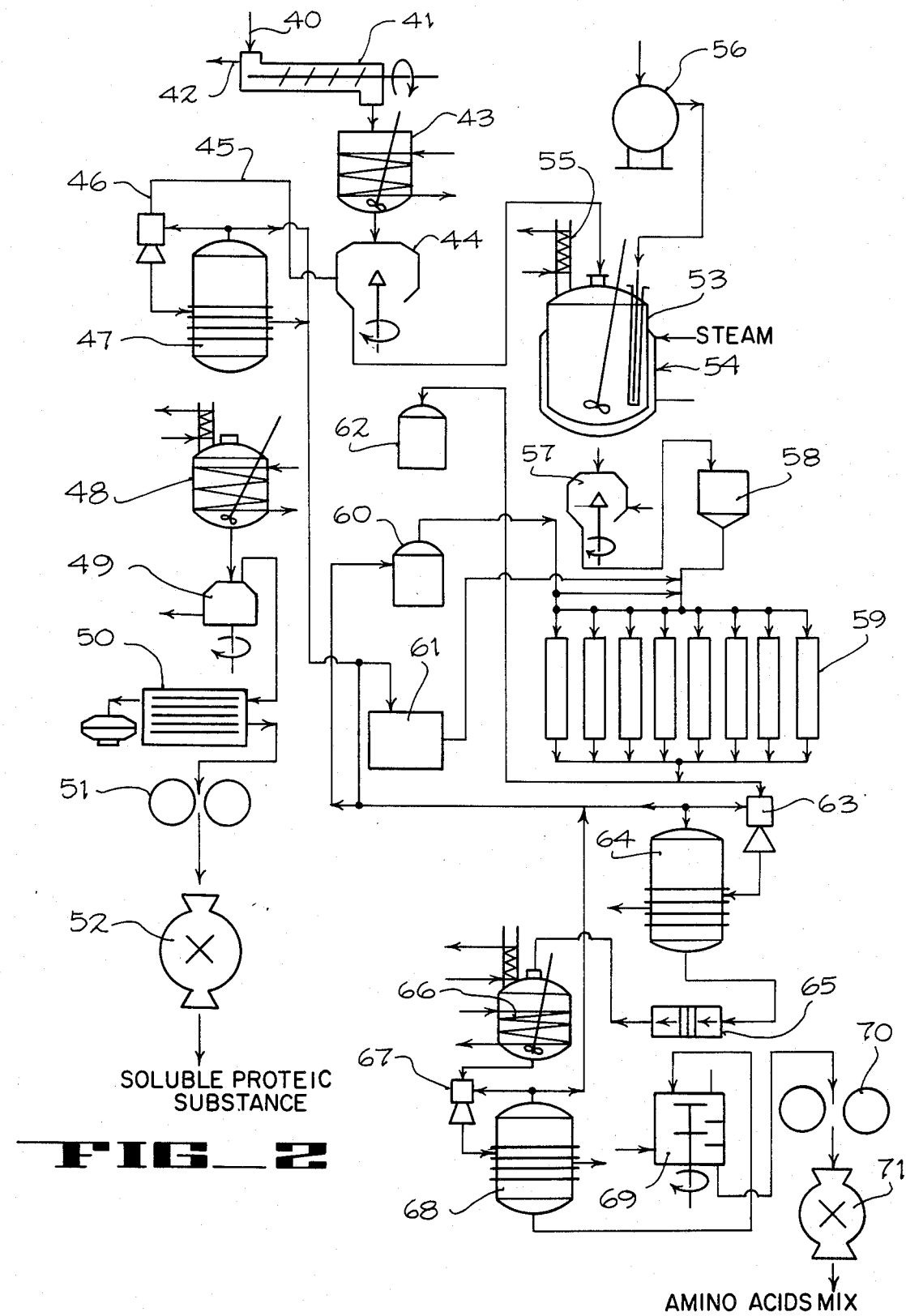
FIG_2

METHOD FOR PRODUCTION OF USEFUL SUBSTANCES FROM SOYMEAL

This is a continuation-in-part of Ser. No. 587,838, filed Mar. 12, 1984, which in turn is a continuation of Ser. No. 516,285, filed July 22, 1983, both now abandoned.

The present invention is directed for a method for recovering useful products from de-oiled soymeal. In particular, the present invention is directed to a method for recovering a useful soluble proteic substance and free amino acids from soymeal.

Amino acids are the essential components of proteins, therefore there is a high nutritional requirement for them. Amino acids may be provided from food protein, however, the body must break down this food protein into free, individual amino acids so that the specific proteins required by the body may be synthesized. The process of breaking down and synthesizing proteins within the body is done with enzymes, which are also proteins. Therefore, the body needs a source of free amino acids, i.e., amino acids which are not chemically bound to form a protein structure. In particular, since eight of the twenty-two amino acids cannot be synthesized by humans, these eight must be obtained from outside sources, such as, from the food we eat and/or from amino acid supplements to our diets. The eight essential amino acids are isoleucine, leucine, lysine, methionine, phenylalnine, threonine, tryptophan, and valine.

It is therefore an object of the present invention to provide a source of free amino acids derived from soymeal.

It is a further object of the present invention to provide a source of a soluble proteic substance from soymeal which may be useful as a protein supplement.

It is another object of the present invention to provide method for processing soymeal whereby useful soluble proteic and free amino acids may be isolated.

These and other objects of the present invention will become readily apparent from the following description.

In the accompanying figures:

FIG. 1 is a diagram of the preferred steps in the method according to the present invention.

FIG. 2 is a diagram of the preferred apparatus for use according to the present invention.

The present invention provides a method for recovering useful products from de-oiled soymeal comprised of steps of extracting the de-oiled soymeal with aqueous liquid at a temperature in the range of 60°-95° C.; separating the liquid extract from the residue and subjecting the residue to aqueous acidic hydrolzing conditions; separating the liquid phase from the hydrolysis mixture and absorbing it onto a cationic sulfonated resin; eluing the amino acids from the resin with aqueous base; ultrafiltering the eluate; and purifying the filtrate from the ultrafiltration to provide a mixture of free amino acids.

The method according to the present invention also provides a soluble proteic substance by utilizing the liquid extract derived above from the de-oiled soymeal. Boiling of the liquid extract, followed by cooling and separating the liquid phase from the solid material, and lyophilizing the liquid phase forms a useful soluble proteic substance.

The primary products derived from the present process are a soluble proteic substance containing assimilable carbohydrates and a quantity of protides (proteins and amino acids) suitable to impart an agreeable taste to the mixture. A second substance produced according to the present process is a composition containing free amino acids.

Additionally, there are other byproducts of the present process which may have ancillary uses, such as for fertilizer or animal feed.

Referring to FIG. 1, the starting material is soymeal from which the oil has been extracted (de-oiled soymeal). A typical analysis of de-oiled soymeal is approximately 37% proteins, 35% carbohydrates, 14% ashes (mineral salts), 5% lipids, and about 9% water. Usually, the de-oiled soymeal is first dried 10. The mixture is then extracted 11 with warm water, usually in the range of 60°-95° C., and the extract and solid residues are separated, usually by centrifugation 12. The hot water extraction is usually accomplished within about 3 hours for a load of 8000 kilograms soymeal, wherein the initial temperature of extraction is about 95° C., with gradual cooling to about 60° C.

The liquid from the centrifugation is then concentrated 13, usually to a dense fluid with a specific weight (at 80° C.) of about 1.3 to 1.4. The concentrate is then boiled 14, usually for about 2 hours, then cooled 15 to about 20° C. and centrifuged 16. The solid residue from centrifugation 16 may be dried 17 and milled 18 to yield cellulose, protein and starchy substances, termed By-Product 1. After drying at 120° C., the typical composition of By-Product 1 is shown below in Table 1.

TABLE 1

| Composition of the Residue Panel | |
| --- | --- |
| Humidity | 6-8% |
| Proteins | 3-5% |
| Ashes | 6-8% |
| Cellulose | 70% |

The liquid from centrifugation step 16 may be lyophilized 19 and milled 20 to yield a water-soluble proteic substance. A typical analysis for this soluble proteic substance is shown in Table 2.

TABLE 2

| Analysis of Soluble Proteic Substance | |
| --- | --- |
| Humidity | 1-2% |
| Protides (Proteins and amino acids) | 17-22% |
| Carbohydrates | 30-35% |
| Ashes | 12-15% |

The soluble proteic substance may be used, for example, to prepare beverages combined with water or milk, or may be utilized with vitamized, non-alcoholic beverages or in slightly alcoholic beverages or bitter tonics. The protide content (the proteins and amino acids) of the soluable proteic substance is such that it has a pleasing taste.

The solid residue from centrifugation is step 12 is hydrolyzed under aqueous acidic conditions 13, preferably with hydrochloric acid, so that the acid concentration in the reaction mass is about 15%. Usually, the mixture will be heated to approximately 90°-120° C., preferably 110° C., which temperature is maintained for a period of time sufficient to accomplish hydrolysis, usually in the range of 46-96 hours. It will be understood, however, that the longer the time of hydrolysis, up to the limit of approximately 100 hours, the greater the percentage of amino acids obtained in the final product. After 100 hours of hydrolysis at 110° C., however, the yield of amino acids decreases.

After hydrolysis the reaction mass is cooled 14, usually to about 35°, and diluted 15. The dilution is for the purpose of lowering the concentration of hydrochloric acid to about 7% and to form the reaction mass into a transportable fluid. Also, dilution prepares the reaction mass to a suitable concentration for the subsequent absorption on resins for purification. The diluted mass is centrifuged 16 and the solid residue is diluted 17, centrifuged again 18, and dried 19 to produce a by-product, termed By-Product 2, having a typical composition as shown in Table 3.

TABLE 3

| Composition of the Panel | |
|---|---|
| Water | 6-8% |
| Proteins | 14-16% |
| Ashes | 15% |
| Carbonic Residue | Left Over |

The liquid supernatant from centrifugation step 16 is then absorbed on cationic sulfonated resins 20. After absorption, the amino acids are eluted 21, with an aqueous base, such as 2% aqueous ammonia. A typical adsorption-elution time table is set forth below in Table 4 wherein the acidic liquid is first adsorbed into the resin, then the resin is washed to remove residual acid, ammonia solution is added to elute the amino acids and, finally, water is added to clear the resin of the ammonia solution.

TABLE 4

| ELUATE (mc.) | FLUX Liter/ Hour Resin | FLUX Liter Stanchion (2.5 mc. Resin) | FLUX Liter/Hour 8 Stanchion (20 Mc. Resin) | TOTAL TIME Hours and Minutes |
|---|---|---|---|---|
| Acid (55) | 0.8 | 1980 | 15900 | 3 hrs. 28 mins. |
| Washing Acid (30) | 0.8 | 1980 | 15900 | 1 hr. 53 mins. |
| Ammoniac (50) | 0.6 | 1500 | 12000 | 4 hrs. 10 mins. |
| Ammoniac Washing (30) | 0.8 | 1980 | 15900 | 1 hr. 53 mins. |
| | | | | 11 hrs. 24 mins. |

The ammonia elutions and washings are then concentrated 22 and ultrafiltered 23 through a membrane having a molecular weight cutoff of 1000. The retentate from the ultrafiltration step comprises By-Product 3 which has ancillary uses, such as animal feed or fertilizer. The filtrate from the ultrafiltration step 23 is purified 24, usually by adsorption onto a carbonaceous material with heating. After cooling 25, the mixture is centrifuged 26 and the separated carbon, which may contain about 10% of the recoverable amino acids, is diluted 27, boiled 28, centrifuged 29. The liquid from the centrifugation step 29 may be mixed from the liquid from centrifugation step 26 for further recovery of amino acids. The carbon recovered from the centrifugation step 29 may then be dried 30, and then recycled. The liquid from centrifugation step 26 is concentrated 31, dried 32, and cooled 33 in vacuum. The resulting dried product is then milled 34, and comprises a mixture of amino acids which may then be packaged. A typical yield of the amino acid mixture is about 2,000 kilograms from a 8,000 kilogram soymeal sample, or about 25% yield. A typical analysis of the amino acid mixture product is shown below in Table 5.

The steps 31, 32, 33 and 34 are preferably conducted utilizing a conventional micronizer, many of which are commercially available, such as the NIRO model micronizer. Typically, in Step 31, the liquid will be concentrated to about one-tenth of its volume then added to the micronizer. The micronizer will typically provide a current of forced air heated at approximately 80° C. to further evaporate liquid at a rate of about 500 liters per hour. Using liquid feed containing about 20% amino acids, this would produce a solid product at the rate of about 100 kilograms per hour. The micronized solid may then be further dried by aspiration and collected as a powder in waterproof bags. The moisture content of the final product will usually be in the range of 0.5 to 1% by weight.

The analysis (Table 5) is the median value obtained from a series of twelve preparations.

TABLE 5

| Appearance: White or white-cream colored powder | |
|---|---|
| Humidity | 4% |
| Ashes | 0.7% |
| Lipides | 0.11% |
| Total sugar reducers | 0.12% |
| Free amino acids | 91.3% |
| Total amino acids | 95.1% |
| pH (2% in water) | 4.9% |
| Point of fusion | 195-200° C. (Decomposes at 225° C.) |
| Chlorides | Below 200 ppm |
| Heavy metals | Below 20 ppm |
| Iron | Below 200 ppm |

| Amino Acids | Total % | Free % |
|---|---|---|
| ASPARTIC ACID | 7.2 | 6.95 |
| THREONINE | 2.28 | 2.08 |
| SERINE | 2.95 | 2.15 |
| GLUTAMINIC ACID | 11.9 | 9.4 |
| PROLINE | 4.82 | 5.9 |
| GLYCINE | 3.69 | 3.84 |
| ALANINE | 5.65 | 5.9 |
| VALINE | 8.27 | 8.3 |
| METHIONINE | 0.32 | 0.48 |
| ISOLEUCINE | 8.42 | 8.05 |
| LEUCINE | 14.57 | 13.9 |
| TYROSINE | 0.35 | 0.42 |
| PHENYLALANINE | 2.76 | 2.7 |
| LYSINE | 10.99 | 10.4 |
| HISTIDINE | 2.79 | 3.02 |
| ARGININE | 7.81 | 7.66 |
| TRYPTOPHAN | .33 | .15 |
| | 95.1 | 91.3 |

Recovery and recycling

The panels remaining from the various phases of purification are dried and group up and mixed and packaged in sacks of 25 kg (Table 7).

TABLE 7

| Median Composition of Recovery Panels | |
|---|---|
| Humidity | 7% |
| Ashes | 13.6% |
| Nitrogen (Kjeldhal) | 3.4% |
| Proteins (Nitrogen X 6.25) | 21.4% |
| Carbohydrates | 14.7% |
| Chlorides | 2.6% |
| Heavy Metals | Below 200 ppm |
| Iron | Below 2000 ppm |
| Carbon | 40.8% |
| Silica | 2.1% |

Step 24 described above comprises absorption of the filtrate onto a carbonaceous material. While commerical activated carbon may be utilized for this purpose, it is preferred that activated carbon be prepared from natural coal according to the following process. Coal, either in its natural wet state or in a dried form, is mixed with deionized water. The amount of water used should be about twice by weight of the amount of coal which is used. This slurry is then heated to boiling, preferably for approximately one hour, then cooled and the solids are separated, preferably by centrifuge. The coal comprising a solid residue is then heated to about 2,000° C. for approximately two hours. Then, the temperature is lowered to about 1,000° with further heating for about four hours. The resultant activated carbon may then be utilized in Step 24 described above. The yield of activated coal from this process is approximately 80–85% based on the weight of the original undried coal. The activated coal made according to this process should be maintained in an anhydrous environment after cooling and before use.

Referring to FIG. 2 there is shown a typical apparatus for use in the present process. The soymeal is poured into inlet 40 of a continuous cycle rotary oven 41. A typical oven may be 12 meters long, divided into two sections each of six meters. The first section may be heated to about 80° C. and the second to 110° C. An aspirator 42 withdraws vapors from the oven. The capacity of a typical oven is 33 kilograms per minute so that drying of the whole load of 8000 kilograms may be accomplished in approximately four hours. The dried flour is removed from the oven and pumped into an iron boiler 43, typically having a capacity of 100 cubic meters and having stem heat coils on its exterior. About 48 cubic meters of water at 95° C. is previously added to the tank 43 before pumping in the dried soymeal. The soymeal is gradually added to the tank over a period of approximately 30 minutes with slow agitation. After all the soymeal is added the mixture is agitated for an additional 30 minutes at 95° C. The tank is then slowly cooled by running ambient temperature water through the outer coils. Once a temperature of approximately 60° C. is obtained, usually in approximately 2 hours, the mass from tank 43 is extracted and unloaded with a pump (not shown) into an automatic gap centrifuge 44.

After configuration, the liquid phase is expelled via line 45 through filter 46 into a continuous concentrator 47 and water is evaporated at a temperature of about 80° C. The dense fluid mass is transported into a boiler 48 equipped with an agitator. In boiler 48 the mixture is heated with steam and boiled for approximately 2 hours. The mixture is then cooled in a separate container (not shown) to approximately 20° C. and then centrifuged in centrifuge 49.

The solid panel from centrifuge 49 contains By-Product 1, described above. The liquid from centrifuge 49 is then lyophilized in lyophilizer 50 under vacuum. The solid product is then ground in mill 51 and sifted through sifter 52 to produce a soluble proteic substance, described above. The solids panel from centrifuge 44 is pumped through a jet pump (not shown) into reactor tank 53 equipped with steam heater 54 and condenser 55. Acid is added into tank 53 from acid storage tank 56. The contents of tank 53 are then centrifuged in centrifuge 57, solids of which are collected and dried as described above to produce By-Product 2.

The liquid from centrifuge 57 is placed into storage tank 58 discharges onto adsorption columns 59. Various washings of the adsorption columns are accomplished by appropriate valves (not shown) from ammonia solution storage tank 60 and water storage tank 61. Acidic residual from columns 59 may be taken off to residual storage tank 62. The amino acid containing eluate from columns 59 is filtered through filter 63 into concentrator 64, then ultrafiltered through ultrafiltration means 65. The retentate is collected on the ultrafiltration membrane in 65 and is periodically removed as By-Product 3, described above. The filtrate from ultrafiltration means 65 lead into tank 66 equipped with heating coils and condenser where it is purified by heating with carbonaceous solids. Preferably the carbonaceous solids used will be activated carbon prepared as in the process described hereinabove from natural coal. The contents are then filtered through filter 67 and/or centrifigued (not shown) whereupon the solid carbonaceous residue is treated as described above for recycling. The filtrate from filter 67 is conducted into concentrator 68 where it is concentrated into a syrupy mass at about 80° C. The contents of tank 68 are then led into rotating drum dryer 69 where it is dried under vacuum, then ground in mill 70 and sifted in sifter 71 to provide the amino acid mixture described above.

EXAMPLE 1

Isolation of Soluble Proteic Substance

Approximately 8,000 kilograms of soymeal are placed in a continuous cycle, rotary oven with a cochlea carrier for drying. The soymeal is dried in a first section of the oven to add about 80° C. and in a second section at about 110° C. and is moved through the dryer at about 33 kilograms/minute so that the drying occurs in about 4 hours. The dried soymeal, still hot, is removed from the dryer, gathered and pumped with a jet pump into an iron boiler with a capacity of 100 cubic meters with steam heat coils covered on the outside by metal sheets thermally isolated toward the exterior. About 48 cubic meters of water, previously heated to 95° C., is pumped into the tank prior to adding the dried flour into the boiler with agitation, about 10 cycles per minute for 30 minutes. Once all the soymeal has been poured into the boiler, agitation and heating at 95° is continued for about 30 minutes, then the tank is cooled by circulating ambient temperature water through the coils.

Once a temperature of 60° is attained, in approximately two hours, the mass of extracted matter is unloaded into an automatic gap centrifuge. The load is centrifuged at 800 cycles/minute for about 4 hours. The liquid phase is expelled from the centrifuge and goes directly into a continuous concentrator which in four hours evaporates 32 cubic meters of water. The concentrate, 4 cubic meters, is a dense fluid having a specific weight of 1.3–1.4 at 80° C. At 80° C. this dense fluid is transported into a 6 cubic meter boilers, with an agitator and an exterior coil for heat and recovery of steam.

The mixture is boiled for 2 hours and unloaded into a container with a water cooling coil of the capacity of 5 cubic meters. The mixture is cooled to 20° C. gradually in 12 hours. The insoluble portion is removed by processing an automatic gap centrifuge. The exit for the liquid phase of the centrifuge occurs continuously from the top through forced withdrawal. The 500 kilogram solids panel is removed by scraping the bottom of the centrifuge.

The cellulose, protein and starchy substances are dried in an oven at 120° and milled to produce a substance, described as By-Product 1, the composition of which is set forth in Table 1 above. The liquid portion of the centrifuge is sent to a lyophilyzation which is preceded by prefreezing at 30° C. This phase is completed in 24 hours and the product is obtained by a sifting mill (80 mesh/cm$^2$) and then is immediately gathered in 10 kilogram pacified cloth sacks, to yield a soluble proteic substance described above in Table 2. The yield is 1,000 kilograms and corresponds to 10% of the soymeal.

EXAMPLE 2

Isolation of Free Amino Acid Mixture

The solids panel from the initial water extraction step above is pumped through a jet pump into a reactor of 60 cubic meters heated by an exterior coil and an agitator and condenser. Thirteen cubic meters of deionized water and 3,900 kilograms of anhydrous hydrochloric acid is added while controlling the flux of water and acid so that dilution is approximately 23%. The concentration of the hydrochloric acid is diluted by the added water and the water already contained in the mass to a concentration of approximately 15%. While under agitation the mixture is heated to 110° C. at which temperature it is maintained for 72 hours. After cooling to 35° C. which is attained in about 8 hours of circulating ambient water through the steam coil, there is added to the mass, 26 cubic meters of water, which brings the hydrochloric acid concentration to about 7%. This mass is then centrifuged in an automatic gap centrifuge which is resistant to hydrochloric acid at the speed of 800 turns/minute with unloading of the solids panel from the bottom. This part of the process is completed in 3 hours, and the unloaded panel is placed in a 10 cubic meter container. An additional 3 cubic meters of water are added and agitated for an hour, then centrifuged. A washed panel is dried at 110° C. to produce the product described as By-Product 2 above and described in Table 3.

The acid water phase from the first centrifuge step above, about 55 cubic meters, is gathered in a fiberglass container of 60 cubic meters and adsorbed onto 8 separate columns, one meter in diameter, 4 meters in height each containing 2.5 cubic meters of cationic sulfonated resin. The flowing liquid is gathered in a fiberglass container of 100 cubic meters. The wash of the acid left within the columns is done with 30 meters of water and is then gathered with the previously recovered acid for recycling. The amino acids obtained from the resin in the columns are diluted with 50 cubic meters of 2% ammonia. The first 20 cubic meters passing through the column having approximately neutral pH do not contain amino acids and are recycled into the water tank. The next 30 cubic meters are continuously carried into a concentrator already prepared for the recovery of ammonia with regulated water drops in order to maintain an emmolient solution of 2%.

The columns are washed with 30 cubic meters of water which are then concentrated in the same evaporator. The concentration of ammonia liquids is increased to the point that the residual volume of 4 cubic meters is reached. The concentrated mixture is then subjected to an ultrafiltration membrane having a molecular weight cutoff of 1,000 MW. The filtration speed is approximately 70 liters/minute so that the filtration is completed in about one hour. Approximately 10 kilograms of dry residue, described as By-Product 3 above, is removed from the filter as a retentate. Filtrate from the ultrafiltration step is emptied into a boiler heated by a coil with an agitator operated at about 10 cycles/minute. While under agitation, 500 kilograms of vegetable bleaching coil is added and the mixture is heated to boiling for 2 hours, then cooled to 30° C. The separation of coal is obtained through centrifugation in a centrifuge with a transportable bag at a speed of about 800 turns/minute. The separate carbon contains approximately 10% of the amino acids. The coal is carried to the previously mentioned boiler, 1.5 cubic meters of water is added and is heated to boiling for 30 minutes and after cooling it is centrifuged. The panel of coal from the centrifuge contains about 1% amino acids, carbohydrates and other impurities, is dried at 110° C. and stocked for recycling. The watery solutions, without color or lightly yellow are further concentrated to one half of their volume. This fluid mass is kept at 80° C. to prevent solidifying and is sent to a dryer with a turning drum circulating hot air with a vacuum device. Drying is completed in 3 hours followed by cooling in vacuum. The complex of amino acids is unloaded, cooled and immediately set for milling, sifting and packaging. The amino acid mixture product is hygroscopic and must be stored in a dry environment with relative humidity below about 50%. The yield of amino acid mixture is approximately 2,000 kilograms or 25% of the weight of the original soymeal.

EXAMPLE 3

The same procedure is followed as in Example 2 above, except that the time for acid hydrolysis is reduced to 48 hours. After 48 hours of hydrolysis at 110° C. in hydrochloric acid, the process is completed as described above. The precentage of amino acids obtained is approximately 18% yield and the analysis is similar to that shown above in Table 5.

EXAMPLE 4

The procedure is the same as in Example 2 except that the acid hydrolysis time is increased to 96 hours. The percentage of amino acids obtained is about 26%. However, analysis revealed that there was no tryptophan in the final amino acid mixture.

EXAMPLE 5

The same procedure is followed as in Example 2 above except that the hydrolysis step is conducted under two atmospheres of pressure, 110° C. for 48 hours. The percentage of amino acids obtained is 17.8%, with the absence of tryptophan and tryrosine from the final product.

EXAMPLE 6

The procedure as followed is the same as Example 5 above, but the time of hydrolysis was reduced to 24 hours. The percentage of amino acids was 24.8% with amino acid analysis similar to Table 5 above, except the percentage of tryptophan was 0.26% (free), 0.41 (total).

EXAMPLE 7

The same as Example 5 except that the time of hydrolysis is reduced to 12 hours. The percentage of amino acids is 14.2% and with the analysis of the amino acids similar to that of Table 5, except that the percentage of tryptophan is 0.24% (free) and 0.43% (total).

EXAMPLE 8

The procedure is the same as Example 2 except that the filtration step after elution from the columns is omitted. To obtain the same purity as in Example 2, it was necessary to add three times the quantity of bleaching coal relative to the expected weight of amino acids with excessive increases of water for washing to recover amino acids withheld by the carbon.

Summarizing the above examples with regard to time of hydrolysis at 110° C. and one atmosphere, Table 6 is shown below.

TABLE 6

| Time of Hydrolysis | | Percentage of Amino Acids |
|---|---|---|
| Hours | 6 | 6.0% |
| " | 12 | 4.5% |
| " | 24 | 11.0% |
| " | 48 | 18.0% |
| " | 72 | 24.6% |
| " | 96 | 26.3% |
| " | 120 | 21.5% |

What is claimed is:

1. A method for recovering useful products from de-oiled soymeal comprising the steps of
   (a) extracting said residue with aqueous liquid at a temperature in the range of 60°–95° C.;
   (b) separating the liquid extract from step (a), from said residue;
   (c) subjecting said residue from step (b) to aqueous acidic hydrolyzing conditions;
   (d) separating the liquid phase from the mixture in step (c) from said residue;
   (e) contacting said liquid phase with a cationic sulfonated resin;
   (f) eluting amino acids from said resin with aqueous base;
   (g) subjecting the eluate of step (f) to ultrafiltration;
   (h) purifying the filtrate from step (g) on carbonaceous adsorbent;
   (i) separating amino acid containing liquid from said carbonaceous adsorbent.

2. The process according to claim 1 further comprising the steps of
   (c') boiling said liquid extract from said step (b);
   (d') cooling the product of step (c) to form a liquid and solid phase;
   (e') separating said phases in step (d');
   (f') lyophilizing the liquid phase from step (e').

3. The method according to claim 1 further comprising the steps of
   (e") washing said residue from step (d);
   (f") drying said residue from step (e").

4. The method according to claim 2 further comprising the steps of collecting and drying the solid phase herein step (e').

5. The method according to claim 1 wherein said step (c) comprises contacting said residue with aqueous hydrochloric acid at a temperature of up to 150° C.

6. The method according to claim 5 wherein the concentration of said acid is in the range of 5–25%.

7. The method according to claim 6 wherein said temperature is 110° C. and said acid concentration is 15%.

8. The method according to claim 1 wherein said step (f) comprises sequentially eluting said resin with 2% aqueous ammonia and water.

9. The method according to claim 1 wherein said step (g) comprises contacting said eluate with a 1000 MV cutoff ultrafilter.

10. The product produced according to step (i) in the process of claim 1.

11. The product according to claim 10 comprising
    13.9% free leucine
    0.42% free tyrosine
    2.7% free phenylalanine
    10.4% free lysine
    3.02% free histidine
    7.66% free arginine
    0.15% free tryptophan.

12. The product produced according to step (f') of claim 2.

13. The product according to claim 12 comprising
    17–22% protides
    30–35% carbohydrates
    12–15% ashes (inorganics).

14. The product produced according to claim 13.

15. The product produced according to claim 14 comprising 14–15% proteins and 15% ashes (inorganics).

16. The product produced according to claim 4.

17. The product produced according to claim 16 comprising
    3–4% protein
    6–8% ashes (inorganics)
    70% cellulose.

18. A product retentate produced according to the process of claim 9.

19. A product according to claim 10 comprising by weight:

| | |
|---|---|
| lipids | 0.11% |
| total sugar reducers | 0.12% |
| total amino acids | 95.1% (91.3% free amino acids) |
| ash | 0.7% |
| chlorides | below 200 ppm |
| heavy metals | below 20 ppm |
| iron | below 200 ppm |
| water | approximately 4% |

20. A product according to claim 11 comprising by weight:

| | Total % | Free % |
|---|---|---|
| Aspartic Acid | 7.2 | 6.95 |
| Threonine | 2.28 | 2.08 |
| Serine | 2.95 | 2.15 |
| Glutamic Acid | 11.9 | 9.4 |
| Proline | 4.82 | 5.9 |
| Glycine | 3.69 | 3.84 |
| Alanine | 5.65 | 5.9 |
| Valine | 8.27 | 8.3 |
| Methionine | 0.32 | 0.48 |
| Isoleucine | 8.42 | 8.05 |
| Leucine | 14.57 | 13.9 |
| Tyrosine | 0.35 | 0.42 |
| Phenylalanine | 2.76 | 2.7 |
| Lysine | 10.99 | 10.4 |
| Histidine | 2.79 | 3.02 |
| Arginine | 7.81 | 7.66 |
| Tryptophan | .33 | .15 |
| | 95.1 | 91.3 |

* * * * *